United States Patent [19]

Bahn et al.

[11] Patent Number: 5,043,369
[45] Date of Patent: Aug. 27, 1991

[54] GLASS/GLASS-CERAMIC-PLASTIC ALLOY ARTICLES

[75] Inventors: Wendy A. Bahn; George H. Beall, both of Big Flats; Joseph Ference, Corning; Beth C. Monahan, Painted Post; Candace J. Quinn, Corning; Paul S. Roussel, Painted Post, all of N.Y.

[73] Assignee: Corning Incorporated, Corning, N.Y.

[21] Appl. No.: 403,655

[22] Filed: Sep. 11, 1989

Related U.S. Application Data

[63] Continuation-in-part of Ser. No. 258,676, Oct. 17, 1988, abandoned.

[51] Int. Cl.$^5$ ............................................ C08G 51/04
[52] U.S. Cl. .................................... 523/466; 524/492; 524/494; 501/11; 501/32; 65/66; 65/137
[58] Field of Search ................. 524/492, 494; 523/466; 501/32, 11; 65/66, 137

[56] References Cited

U.S. PATENT DOCUMENTS 3,732,181  5/1973  Hartford et al. .................... 523/207
4,141,877  2/1979  Luttinger et al. .............. 260/37 EP

FOREIGN PATENT DOCUMENTS 2008041   7/1975  Japan ................................... 524/492
0133058  12/1983  Japan ................................... 524/492
0133059  12/1983  Japan ................................... 524/492

*Primary Examiner*—Paul R. Michl
*Assistant Examiner*—Yong S. Lee
*Attorney, Agent, or Firm*—C. S. Janes, Jr.

[57] ABSTRACT

This invention is directed to the preparation of alloy articles consisting essentially of glass and/or glass-ceramic and an organic thermoplastic or thermosetting polymer having a working temperature compatible with that of the glass and/or the precursor glass for the glass-ceramic. The glass and polymer are combined at the working temperature to form an intimate mixture; i.e., the glass and polymer are in a sufficiently fluid state to be blended together to yield a body exhibiting an essentially uniform, fine-grained microstructure wherein, desirably, there is at least partial miscibility and/or a reaction between the glass and the polymer to promote adhesion and bonding therebetween. A body is shaped from the mixture and cooled to room temperature.

73 Claims, 2 Drawing Sheets

GLASS/GLASS-CERAMIC-PLASTIC ALLOY ARTICLES

This is a continuation-in-part of Ser. No. 258,676, filed Oct. 17, 1988 and now abandoned.

BACKGROUND OF THE INVENTION

Composite bodies containing organic polymers are well known to the art. Generally speaking, polymer composites, which may be regarded as multiphase materials of two or more components in which the polymer comprises the continuous phase, can be considered as containing fillers or reinforcing agents, the function of the two frequently overlapping. Thus, polymer composites have conventionally consisted of a base polymer containing additives such as plasticizers, colorants, flame retardants, reinforcing fibers and/or whiskers, fillers, and stabilizers against heat and/or sunlight. Polymer cements constitute another type of composite wherein the continuous phase is ceramic and the properties exhibited thereby are essentially those of a modified ceramic rather than a modified polymer. For example, a polymer is allowed to diffuse into the cement and is then polymerized in situ. Hence, polymer composites have typically been considered as being prepared from materials of two separate origins which have been physically produced by dispersing one phase in a continuous matrix of another phase.

However, there is a further class of materials involving combinations of polymers which have been termed polymer alloys or blends. In addition to one phase being fluid at some time in the preparation, as with conventional composites, in polymer alloys the second phase can also be fluid, either as a melt or as a polymerizing monomer. In this way a range of structures can arise. In addition, alloys provide a facility which conventional polymer composites cannot, in that the opportunity for phase reversal or inversion is presented, depending primarily, but not entirely, on the relative concentrations of the two polymers, inasmuch as the relative viscosity at the fabrication temperature is also important. Thus, from a state wherein one component is continuous in phase, a polymer alloy can comprise a system which is continuous with respect to the second phase or one in which both phases are continuous. Hence, one component can become enclosed in the second component and vice versa. Accordingly, where the properties of the two polymers are different, extreme changes in mechanical behavior can be experienced in the alloy vis-a-vis the starting components.

Alloys consisting of a combination of two or more polymeric resin systems where at least one of the polymers is present in a concentration greater than 5% by volume are well known to the art. Hence, alloys are mixtures of two or more resins which are blended, customarily in the molten state, to form new materials. Unlike copolymers, grafts, or interpenetrating polymer networks, no chemical synthesis or formation of new covalent bonds need occur. Alloys have been designated as either miscible or immiscible depending upon the number of phases present. To illustrate:

Miscible or soluble blends comprise one phase with one glass transition temperature (Tg). Individual polymer segments are intimately blended with some specific chemical or physical attraction taking place between dissimilar polymer chains, e.g., hydrogen bonding or donor-acceptor. In contrast, immiscible alloys consist of two or more discrete phases (continuous and disperse) and two or more Tgs. Completely immiscible alloys have limited product potential, however, inasmuch as delamination of materials is hazarded during processing because of lack of adhesion at the polymer interface.

Most commercially-marketed resin alloys are formed via some type of melt mixing utilizing a continuous-type intensive mixer or an extruder. Thus, two or more polymers in pellet or powder form are generally premixed or metered into an extruder, either a single screw or a multiscrew extruder, or into a continuous-type intensive mixer, fluxed for a brief period, and then shaped into pellets from strands or being diced from sheet.

Inorganic glasses can exhibit many desirable properties; for example, high elastic modulus, abrasion resistance, stain resistance, thermal stability, inertness to solvents, low coefficient of thermal expansion, and low permeability to moisture and gases. On the other hand, organic polymers can demonstrate such advantageous characteristics as high elasticity, flexibility, toughness, light weight, and ease in shaping, which properties are generally lacking in inorganic glasses.

As was noted above, filled plastic products are commercially available. Those products customarily consist of organic polymers enveloping discrete organic or inorganic particles, flakes, fibers, whiskers, or other configurations of materials. These filler materials may be incorporated principally for the purpose of reducing the overall cost of the product without seriously undermining the properties of the polymer. For example, clays and talc have been added as inexpensive fillers. On the other hand, the filler materials may be included to impart some improvement to a particular physical property exhibited by the polymer. For example, ceramic and glass fibers have been entrained in polymer bodies to provide reinforcement thereto. The strength demonstrated by those products is primarily dependent upon mechanical bonding between the inorganic fibers and the organic polymers.

Within the past two decades some research has been conducted to investigate the possibility of forming composite bodies consisting of inorganic glasses exhibiting low transition temperatures and organic polymers, which bodies would, desirably, demonstrate the combined properties of glass and plastic. Illustrative of that research is U.S. Pat. No. 3,732,181. As is observed there, the decomposition temperatures of known thermoplastic and thermosetting resins are so low that glass compositions wherein $SiO_2$ is the principal network or glass former cannot be employed. Hence, to be operable, the Tg of the glass will be below 450° C., and preferably below 350° C. (As customarily defined, the Tg of a glass is the temperature at which increases in specific heat and coefficient of thermal expansion take place which are accompanied by a sharp drop in viscosity. This temperature is frequently deemed to lie in the vicinity of the glass annealing point.) That temperature limitation led to the use of glasses wherein $P_2O_5$ and/or $B_2O_3$ comprises the primary glass forming component. It is further explained there that, whereas thermoplastic resins have been principally investigated for use in glass-plastic composite articles, thermosetting resins which can be obtained as heatsoftenable precursors are also operable. Such resins can be blended with the glass into composite bodies with the re-shaping and final heat curing being completed in a single operation. As preferred thermoplastic polymers, the patent listed high density polyethylene, polypropylene, polystyrene, polymethyl methacrylate, poly-4-methylpentene1, polyethylene. terephthalate, polycarbonates, polysulfones, polyvinyl chloride, and polytetrafluoroethylene. Acid sensitive polymers can be subject to degradation when in contact with glass and, hence, are warned against. Polyamides are noted as being particularly susceptible to that problem, with polyesters being less so.

U.S. Pat. No. 3,732,181 describes seven general methods wherein glass in the form of fibers, films, flakes, powders, or sheets is combined with a polymer and that composite is fashioned into a desired configuration through a variety of shaping means including compression molding, drawing, extrusion, hot pressing, injection molding, and spinning. The patent states that the ratio polymer:glass may range from 0.1:99.9 to 99.9:0.1 on a volume basis, but also observes that the concentration of glass in the polymer typically ranges about 5-66% by volume.

Finally, U.S. Pat. No. 3,732,181 discloses three broad areas of glass compositions exhibiting properties assertedly rendering the glasses suitable for use in glass-plastic composite articles:

(a) $PbO + P_2O_5 \geq 95$ mole %, wherein PbO constitutes 20-80 mole %;

(b) $PbO + R_2O$ (alkali metal oxides) $+ P_2O_5 \geq 95$ mole %, wherein PbO comprises 5-60 mole %, $R_2O$ constitutes 5-35 mole %, and $P_2O_5$ is present up to 85 mole %; and (c) $PbO + R_2O + B_2O_3 + P_2O_5 \geq 95$ mole %, wherein PbO comprises 5-30 mole %, $R_2O$ constitutes 5-30 mole %, $B_2O_3$ composes 5-20 mole %, and $P_2O_5$ makes up 15-85 mole %.

The above composition intervals specify the required presence of PbO, but the patent avers that part or all of the PbO may be replaced with divalent metal oxides, noting in particular the alkaline earth metals and zinc.

A study of that patent, however, uncovers no description of products wherein the glass phase and the polymer phase become co-continuous, or where particles of each phase are simultaneously enclosed within larger regions of another phase, this phenomenon being termed localized phase inversion/reversal. Nor is there any description of bodies wherein the glass and polymer demonstrate at least partial miscibility and/or a reaction therebetween such that the two components are intimately blended together. Nor is there any description of bodies exhibiting an essentially uniform, fine-grained microstructure wherein the glass and polymer elements comprising the microstructure are of relatively uniform dimensions. Contrariwise, U.S. Pat. No. 3,732,181 specifies the presence of fibrils, flakes, rods, strands, and/or spheres of one component in a matrix of the second component. Hence, the patent describes products having the microstructure more akin to that of a conventional filled glass-plastic composite, rather than to that of an alloy.

Experience in the glass composition art has indicated that borate-based and phosphate-based glasses normally exhibit poorer chemical durability and resistance to moisture attack than silica-based compositions, and that failing becomes even more exacerbated as such glasses are formulated to demonstrate lower transition temperatures. For example, phosphate-based glasses manifesting a low Tg are commonly degraded when exposed to atmospheres of high humidity and, not infrequently, are actually hygroscopic. This lack of resistance to attack by moisture frequently encountered in phosphate-based glass compositions is evidenced in the rate of dissolution data provided in U.S. Pat. No. 3,732,181 with respect to the glasses utilized in the working examples. Because of this poor resistance to chemical and moisture attack evidenced by phosphate-based and borate-based glasses having a low Tg, glass-plastic composite articles fabricated from glasses and polymers which are thermally co-deformable at similar temperatures have not been marketed to any substantial extent. Thus, whereas the glass-plastic composite articles known to the art are not porous in a physical sense, the polymers are permeable to water; which permeability permits water to migrate into the article and thereby come into contact with the glass particles. And, because of the high surface area of the glass flakes, fibers, powders, and the like present in the composite articles, degradation thereof can proceed rapidly. That situation becomes more pronounced as the proportion of glass in the composite is increased. Yet, to produce articles exhibiting high stiffness, high hardness, and good mechanical strength, the glass component should constitute the greater proportion thereof.

SUMMARY OF THE INVENTION

As has been explained immediately above, the preparation of glass-plastic composite articles employing glasses and plastics thermally co-deformable at similar temperatures was known to the art. However, because of the poor resistance of those products to chemical and moisture attack, they received little response in the commercial market.

It was posited that, if true alloys of inorganic glass and organic polymer could be produced through melt mixing, i.e., the glass and polymer would be in a sufficiently fluid state to be blended together to yield a body exhibiting an essentially uniform fine-grained microstructure wherein there would desirably be at least partial miscibility and/or a reaction between the glass and the polymer to promote adhesion and/or bonding therebetween, those alloys would demonstrate good resistance to attack by moisture and other chemicals. This resistance to attack would self-evidently be further improved if glasses could be developed displaying better durability than those utilized in the working examples of U.S. Pat. No. 3,732,181.

In light of that conjecture, a program was initiated to develop inorganic glasses that not only exhibited a sufficiently low Tg to be thermally co-deformable with relatively high temperature organic polymers, while inherently displaying good resistance to chemical and moisture attack, but which also could be so blended with the polymers to form bodies having an essentially uniform, fine-grained microstructure wherein most preferably, the glass and polymer elements comprising the microstructure would be of relatively uniform dimensions, and wherein the glasses would interact with the polymers to form alloys exhibiting a combination of high surface hardness, high stiffness, and high toughness. Preferably, the dispersed particles of the glass and polymer elements would be less than 50 microns, most preferably less than 20 microns, in the largest dimension. Moreover, because of the partial miscibility and/or a reaction between the glass and polymer which would desirably be taking place, the melting point of the polymer could be raised, thereby yielding a product demonstrating a higher long term use temperature than that of the polymer alone.

Phosphate-based glasses were selected for study as glass components for such alloy bodies because of their known low transition temperatures. Other characteristics exhibited by phosphate glasses commended them for this study:

(1) unlike silicates, borates, and most other glass formers, phosphorus does not form carbides;

(2) phosphate glasses can demonstrate high coefficients of thermal expansion, matching some commercial polymers;

(3) phosphate glasses are known to dissolve significant concentrations of hydrogen, ammonium, and sulfide ions, as well as organics; and (4) examples of phosphate-polymer composites, such as bone, occur in nature.

That program resulted in the discovery of phosphate-based glasses within two general narrow composition regions which are essentially non-hygroscopic and exhibit good resistance to chemical and moisture attack, and which can interact with a variety of polymers to produce alloy articles. Those two general areas of glasses are encompassed within two United States patent applications filed concurrently with the predecessor of the present application, viz., Oct. 17, 1988, in the names of G. H. Beall and C. J. Quinn. The first, Ser. No. 258,674, now U.S. Pat. No. 4,920,081, discloses glasses consisting essentially in mole percent, of 44–58% $P_2O_5$, 0–7% $Al_2O_3$, 0–10% $B_2O_3$, 4–10% $Al_2O_3+B_2O_3$, 0–30% $Li_2O$, 10–30% $Na_2O$, 10–45% $Li_2O+Na_2O$, 0–20% $Cu_2O$, and 10–30% $Li_2O+Cu_2O$. The second, Ser. No. 258,675 now U.S. Pat. No. 4,940,677, discloses glasses consisting essentially, in mole percent, of 10–35% $R_2O$, wherein $R_2O$ consists of at least two alkali metal oxides in the indicated proportions selected from the group consisting of 0–25% $Li_2O$, 0–25% $Na_2O$, and 0–25% $K_2O$, 12–55% ZnO, and 28–40% $P_2O_5$.

Further research resulted in the discovery of a foreshortened regime of compositions encompassed within the latter application which, when heat treated, can be crystallized in situ to glass-ceramic articles wherein a lithium-, zinc-, and/or lead-containing phosphate constitutes the predominant crystal phase. Hence, the following crystal species have been observed through X-ray diffractometry of the inventive products: $Li_3PO_4$, $Li_2NaPO_4$, $Zn_2P_2O_7$, $Li_6Zn_4P_4O_{17}$, LiZnPO_4, and $Pb_9(PO_4)_6$ Those compositions are included within U.S. application Ser. No. 258,673, now U.S. Pat. No. 4,874,724, also filed concurrently with the predecessor of the instant application in the names of G. H. Beall, J. E. Pierson, and C. J. Quinn, and consist essentially, in mole percent, of 5–25% $Li_2O$, 0–15% $Na_2O$, 0–10% $K_2O$, 5–25% $Li_2O+Na_2O+K_2O$, 35–50% ZnO, 0–15% PbO, 0.75–6% $Al_2O_3$, and 29–37% $P_2O_5$. Finally, U.S. application Ser. No. 372,764, filed June 29, 1989 in the names of G. H. Beall, J. E. Dickinson, Jr., and C. J. Quinn under the title RARE EARTH-CONTAINING ZINC PHOSPHATE GLASSES, discloses compositional modifications in the glass compositions of Serial No. 258,675 resulting in glasses of even greater resistance to chemical and moisture attack. The glasses described therein consist essentially, in mole percent, of 10–35% $R_2O$, wherein $R_2O$ consists of at least one alkali metal oxide in the indicated proportion selected from the group consisting of 0–25% $Li_2O$, 0–25% $Na_2O$, and 0–25% $K_2O$, 12–55% ZnO, 28–45% $P_2O_5$, and 0.5–5% total of $Y_2O_3$ and/or at least one oxide of a rare earth metal selected from the lanthanide group.

The texts of those applications are incorporated by reference in their entirety into the present application.

The glasses of Ser. No. 258,674, Ser. No. 258,675 and Ser. No. 372,674, and the precursor glasses which are heat treated to be converted into glass-ceramic bodies exhibit transition temperatures below 450° C., and more preferably below 350° C., with working temperatures, i.e., temperatures at which the glass demonstrates a viscosity of less than about $10^8$ poises, preferably about $10^4$–$10^7$ poises, below 500° C., and preferably between about 350°450° C. The glasses display excellent resistance to attack by moisture and mild aqueous alkaline solutions—the glass-ceramics even better resistance. Hence, the glasses and glass-ceramics exhibit dissolution rates in boiling water of less than $1 \times 10^{-4}$ grams/cm$^2$/minute.

Therefore, whereas the above-described glass and glass-ceramic compositions are not critical to the operability of the invention, they constitute the preferred compositional embodiments thereof because of their exceptional chemical durability. Hence, as has been pointed out above, the essential characteristics of the glasses are three: (1) a sufficiently low Tg to be thermally codeformable with organic polymers; (2) the capability of interacting with a polymer so as to form bodies having essentially uniform, fine-grained microstructures and to desirably produce at least partial miscibility between the glass and polymer and/or a reaction and/or an attraction force between the glass and the polymer to promote adhesion and/or bonding therebetween; and (3) exhibit excellent resistance to attack by moisture. With respect to the last requirement, the glass must be essentially non-hygroscopic. As defined herein, essentially non-hygroscopic indicates that the glass and/or glass-ceramic component will demonstrate a weight gain of less than $1 \times 10^{-6}$ grams/cm$^2$/minute when exposed at 40° C. to a relative humidity of 80%.

Numerous thermoplastic and high temperature thermosetting polymers are commercially available which have processing or working temperatures compatible with those exhibited by the glasses of the above three applications. Examples of operable thermoplastic polymers include polyarylether ketones, polyphenylene sulfides, polyfluoro resins, polyetherimides, liquid crystal polyesters, polyethersulfones, polytetrafluoroethylenes, polyetherketones, polycarbonates, polyethylterephthalates, polybutylterephthalates, melamines, and polyetherether ketones. Examples of high temperature thermosetting resins include epoxy resins, phenolics, diallyl phthalates, silicone resins, and polyimides.

Intimate mixing of the glass and polymer is necessary to assure the required production of essentially uniform, fine-grained microstructures and, most desirably, partial miscibility and/or reaction between the glass and the polymer. Such appears to be best accomplished through high shear dispersive mixing. Our preferred mode of preparing intimate mixtures through high shear dispersive mixing involves the use of a twin screw extruder.

Intimate mixtures of finely-divided bodies of glass and organic polymer in desired proportions and in various geometries, such as fibers, flakes, and pellets, can be co-formed into integral alloy bodies of predetermined configurations utilizing conventional thermoforming techniques such as extrusion, hot pressing, hot isostatic pressing, blow molding, foam processing, and injection molding, at temperatures required to effect the necessary viscosity in the glass and plastic; viz., temperatures at which the glass and polymer are thermally codeformable. Where desired, conventional colorants can be added during the mixing operation and/or included in the starting polymer and/or glass. The inventive alloys are also very useful in the form of coatings to be applied to various substrates. Where a glass-ceramic/plastic alloy is to be formed, the precursor glass may be crystallized in situ during the hot co-forming process, although a further heat treatment within a similar temperature range may be applied, if desired or if necessary, to assure more complete crystallization of the glass. In general, however, because it usually results in a more homogeneous product, the preferred practice involves co-forming the precursor glass and organic polymer and thereafter heat treating the alloy to crystallize the glass in situ.

Scanning electron micrographs have indicated that the co-forming of the above-described glasses and polymers through melt processing can yield alloy articles having unique microstructures. The particular microstructure developed within the alloy body is dependent upon the relative proportions and the chemistries of the glass and plastic used in the formulation of the body.

Nevertheless, in each instance an intimate mixture of the molten glass and liquid organic polymer takes place, with scanning electron micrographs of fracture surfaces of the alloys clearly indicating extremely strong bonding between the glass and polymer. In some alloys an interphase reaction appears to have occurred between the organic and inorganic components. In other alloys there appears to be significant solubility of the polymer in the glass. Accordingly, the blending of the molten glass and the liquid polymer generally results in partially miscible glass or glass-ceramic/polymer alloys. The morphology of the alloys depends upon the degree of miscibility, the shear rate operating during mixing, and the viscosities of the two liquid phases. In the preferred embodiments, the inventive alloys demonstrate either: (1) an interconnected, co-continuous spinodal-type microstructure; or, (2) a microstructure consisting of fine spherical, ellipsoidal, and/or serpentine particles of glass and/or glass-ceramic separated by thin continuous membranes of polymer and vice versa; or, (3) a fine emulsion of glass and/or glass-ceramic dispersed in polymer and vice versa; or, (4) localized phase inversion/reversal; that is, articles containing two co-continuous phases or one phase dispersed within another, wherein each phase region encloses very small portions or particles of the other phase.

The above second type of microstructure features an interlocking, three-dimensional jigsaw-like pattern comprising islands of glass/glass-ceramic in a matrix of polymer, the polymer matrix taking on the appearance of winding channels. At high magnifications, evidence of partial miscibility accompanying alloy formation can be observed; that is, small droplets of glass can be seen dispersed in the main polymer portion and small droplets of polymer are visible in the glass regions; there being more glass droplets in the polymer than polymer droplets in the glass.

This bimodal microstructure is typical of an exsolution process. Hence, the polymer and glass are intimately melt-mixed together to form an interconnected, co-continuous network. When subsequently cooled, fine particles of both glass and polymer are exsolved. The evidence would indicate that the polymer dissolves more glass than the glass dissolves polymer and, therefore, the volume of glass droplets is much greater in the polymer regions. The gross scale of spinodal microstructure suggests substantial solubility between the glass and polymer phases and also implies low interfacial tension existing between the phases. Low interfacial tension permits the development of a strong bond between two phases. That phenomenon is believed to constitute at least one factor leading to the high strengths demonstrated by the alloy articles of the present invention. Differential scanning calorimeter measurements have shown the phase transition endotherm exhibited by the alloy articles may sometimes be at a higher temperature than the melting point of the polymer.

Although the proportions of glass/glass-ceramic and plastic can quite obviously vary widely depending upon the application to which the composite article is directed, where good abrasion resistance, thermal stability, and resistance to impacts are sought, the article will typically contain at least 30% by volume glass/glass-ceramic. At glass/glass-ceramic levels in excess of 90% by volume, the properties of the plastic desired to be incorporated into the composite article are essentially lost. In general, concentrations of glass/glass-ceramic within the range of about 40–75% by volume are preferred. A composite body consisting of a combination of glass/glass-ceramic and a high temperature thermoplastic or thermosetting resin is of special interest in the fabrication of light weight, scratch resistant, and impact resistant cookware for both microwave and conventional oven use. Such products will desirably exhibit long term use temperatures in excess of 500° F. ($\approx 260°$ C.) and, preferably, higher than 550° F. ($\approx 288°$ C.).

In summary, the method for forming alloy articles of the present invention exhibiting an essentially uniform, fine-grained microstructure comprises three general steps:

(a) high shear dispersive mixing of finely-divided bodies of an inorganic glass and an organic thermoplastic or thermosetting polymer at a temperature and viscosity represented by the working temperature of said glass and polymer to form a melt mixture;

(b) shaping said melt mixture into an article of a desired configuration; and then (c) cooling said article to room temperature.

Where a glass-ceramic-plastic alloy article is to be formed, the shaped article of Step (b) is heat treated to cause the glass component to crystallize in situ.

PRIOR ART

U.S. Pat. No. 3,732,181 was reviewed above in some detail. Thus, as acknowledged there, the patent describes the formation of glass-plastic composite articles by combining the glass and plastic components together at temperatures where the glass and the plastic are thermally co-deformable. However, there is no description of forming an intimate mixture of molten glass and liquid plastic at properly low viscosities wherein an interaction may take place between the glass and plastic to form a body demonstrating an essentially uniform, fine-grained microstructure. Nor is there any evidence of localized phase inversion/reversal or other evidence of solubility of the glass in the plastic and the plastic in the glass. There is no description of an interconnected, co-continuous spinodal-type microstructure or of a microstructure consisting of fine spherical, ellipsoidal, and/or serpentine particles of glass or glass-ceramic separated by thin continuous membranes of plastic as a matrix, and/or a fine emulsion of glass and/or glass-ceramic dispersed in polymer and conversely. None of the specific glass compositions presented in the patent comes within the ranges of Ser. No. 258,674, Ser. No.

258,675, and Ser. No. 372,674. Furthermore, working examples of glasses having transition temperatures of about 300° C. and lower displayed high rates of dissolution in water. Finally, glass-ceramics are nowhere mentioned in the patent.

U.S. Pat. No. 3,885,973 presents glasses which statedly may be suitable for co-processing with organic polymers to form composite articles of the type discussed in detail in U.S. Pat. No. 3,732,181 supra. Nevertheless, there is no express discussion of such co-processing or of the microstructure of the composite articles produced by that process. Therefore, there is no description of forming an intimate melt mixture of molten glass and liquid organic polymer at a viscosity wherein an interaction of the glass and polymer may take place, nor is there any evidence of solubility of the glass in the polymer and polymer in the glass. None of the recorded glass examples has a composition coming within the ranges of Ser. No. 258,674, Ser. No. 258,675, and Ser. No. 372,674, and glass-ceramics are not referred to in the patent.

U.S. Pat. No. 3,926,649 describes glass compositions assertedly suitable for co-processing with organic polymers into composite articles of the type disclosed in U.S. Pat. No. 3,732,181 above. However, there is no explicit discussion of such co-processing or of the microstructure of products resulting from co-processing. Because there is no description of co-processing the glasses with organic polymers, there quite apparently can be no disclosure of forming an intimate melt mixture of molten glass and liquid polymer at a viscosity wherein an interaction may occur between the components, nor is there any evidence of solubility of the glass in the polymer and the polymer in the glass. The glass compositions of the patent are outside the ranges of Ser. No. 258,674, Ser. No. 258,675, and Ser. No. 372,674, and glass-ceramics are nowhere referred to in the patent.

U.S. Pat. No. 3,935,018 also discloses glasses which purportedly may be suitable for co-processing with organic polymers into composite articles of the type described in U.S. Pat. No. 3,732,181 supra. Again, however, there is no specific discussion of such co-processing or of the microstructure of the articles produced by that coprocessing; hence, no description of forming an intimate melt mixture of molten glass and liquid organic polymer at a viscosity wherein an interaction of the glass and polymer may take place, nor is there any evidence of solubility of the glass in the polymer and vice versa. None of the recited glass examples has a composition coming within the ranges of Ser. No. 258,674, Ser. No. 258,675, and Ser. No. 372,674, and glass-ceramics are not mentioned in the patent.

U.S. Pat. No. 3,964,919 also refers to glasses which may be suitable for co-processing with organic polymers into composite articles of the type described in U.S. Pat. No. 3,732,181 above. Yet again, however, there is no detailed discussion of such co-processing or of the microstructure of the articles prepared by that coprocessing. Accordingly, there is no description of forming an intimate melt mixture of molten glass and liquid organic polymer at a viscosity wherein an interaction of the glass and polymer may occur, nor is there any evidence of solubility of the glass in the polymer and conversely. None of the reported glass examples has a composition coming within the ranges of Ser. No. 258,674, Ser. No. 258,675, and Ser. No. 372,674, and glass-ceramics are nowhere mentioned in the patent.

DESCRIPTION OF PREFERRED EMBODIMENTS

Figure 1:
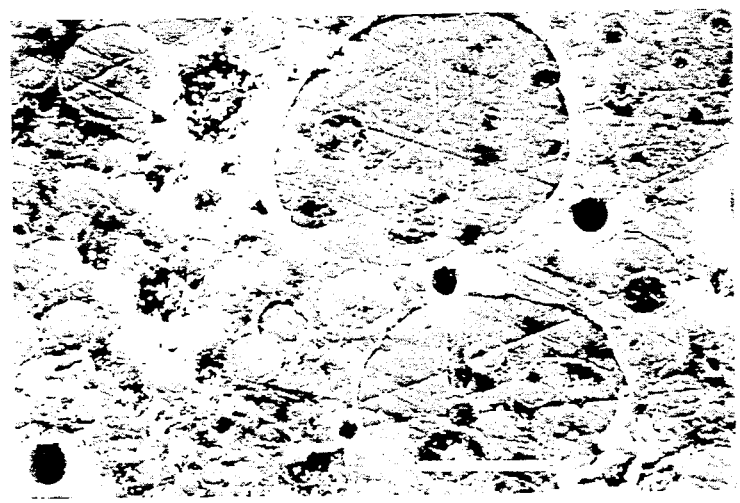
FIGS. 1-5 are scanning electron micrographs illustrating the microstructure of the inventive composite articles.

Table I records a group of glass compositions, expressed in terms of mole percent on the oxide basis, used in preparing the inventive glass/glass-ceramic-plastic alloy articles of the present invention. Each glass was compounded from oxide, carbonate, and phosphate batch materials. Those batch materials were automatically tumble-mixed or ballmilled and melted in silica crucibles at temperatures in the vicinity of 1000° C. for times of about three hours. Very little volatilization of $P_2O_5$, fluoride, or other species was noted. Analyzed values of $P_2O_5$ were typically only a few tenths percent below that calculated from the batch.

Because a pulverized material was desired to form feedstock for extrusion, the melts were poured through patterned metal rollers to produce ribbon with a textured surface which was easily crushed to predetermined-sized fragments; or, more preferably, the melts were poured as a fine stream into a bath of cold water, a practice termed "drigaging.". If desired, the glass particles/fragments may be pelletized for ease of handling.

After thorough drying, the finely-divided fragments/pellets of glass and pellets or powders of organic polymer were fed into a twin screw extruder which can be programmed to operate at temperatures between about 300°-450° C.; temperatures at which the glasses exhibit a viscosity within the range of about $10^4$-$10^7$ poises. The high shear forces generated in the extruder assure very fine melt mixing at those viscosities. The so-mixed material was extruded in a spaghetti-like form with substantial porosity and consequent swelling occurring upon extrusion into the ambient environment.

The extrudate was pelletized, thoroughly dried, and fed into an injection molding machine. Depending upon the glass composition and the polymer involved, the injection molder was programmed to operate at temperatures ranging about 300°-430°C. and at pressures in excess of 15,000 psi.

TABLE I

|  | 1 | 2 | 3 | 4 | 5 | 6 |
|---|---|---|---|---|---|---|
| $P_2O_5$ | 62 | 47 | 56 | 47 | 33 | 33 |
| $B_2O_3$ | — | 5 | — | 5 | — | — |
| $Al_2O_3$ | 2 | 2 | 3 | 2 | 2 | 2 |
| $Na_2O$ | 11 | 21.5 | 18.5 | 21 | 7 | 7 |
| $Li_2O$ | 11 | 21.5 | 18.5 | 21 | 6 | 6 |
| CaO | — | 3 | — | 4 | — | — |
| $Cu_2O$ | 14 | — | 4 | — | — | — |
| $K_2O$ | — | — | — | — | 7 | 7 |
| ZnO | — | — | — | — | 45 | 43 |
| $SiO_2$ | — | — | — | — | — | 2 |

|  | 7 | 8 | 9 | 10 | 11 |
|---|---|---|---|---|---|
| $P_2O_5$ | 33 | 33 | 60 | 34 | 33 |
| $Al_2O_3$ | 2 | 2 | 4 | 1.5 | 2 |
| $Na_2O$ | 8 | 10 | 13 | 7.0 | 7 |
| $Li_2O$ | 7 | 10 | 13 | 6.8 | 7 |
| $K_2O$ | 5 | — | — | 5.2 | 5 |
| ZnO | 40 | 45 | — | 44 | 43 |
| SnO | 5 | — | — | — | — |
| $SiO_2$ | — | — | — | — | 2 |
| $K_2F_2$ | — | — | 10 | — | — |
| $Ce_2O_4$* | — | — | — | 1.5 | — |

TABLE I-continued

| | | | | | |
|---|---|---|---|---|---|
| $Re_2O_x$ | — | — | — | — | 1 |

*Bastnasite was used to provide a combination of rare earth metal oxides.

The following outlines specific extrusion and injection molding parameters employed in the examples reported below:

In each example the glass fragments/pellets having an average particle size of less than 5 mm were dried overnight in a forced air oven operating at 150° C. prior to being extruded with pellets of polymer having a similar average particle size. A twin screw extruder marketed by Haake & Buchler, Saddle Brook, N.J., under the designation Rheocord System 40, was used to achieve the desired fine mixing of glass and polymer. The extruder is designed to have the capability of providing a temperature profile along the length of the barrel thereof. To illustrate, typical extrusion conditions for the glasses and polymers of the following examples involved temperatures between about 300°–360° C. in the first zone, about 320°–430° C. in the second zone, about 320°–430° C. in the third zone, and a die temperature between about 320°–430° C. A rotor speed of about 25–35 rpm was utilized.

In each example the glass/polymer extrudate was pelletized and dried overnight in a forced air oven operating at 150° C. before being fed into a 170 ton Toshiba reciprocating screw injection molding machine. A moisture level less than about 0.01% was commonly measured. The machine was capable of operating at three different internal temperature regions plus a separate nozzle temperature. Typical molding conditions for the glass/glass-ceramicpolymers of the following examples utilized temperatures between about 655°–700° F. in the rear zone, about 670°–750° F. in the center zone, about 685°–775° F. in the front zone, and a nozzle temperature between about 700°–810° F. Die temperatures generally ranged about 350°–550° F. Injection pressures and screw speeds varied with the chemistries of the glass/polymer, the proportions of each component, and the temperatures and times employed in molding.

Table II records several representative mechanical properties measured on alloys prepared from the glass compositions recited in Table I and processed into bodies of the desired configuration required for a particular test. In Table II the abbreviations present therein have the following meanings:

HDT refers to heat deflection temperature which was measured in accordance with a modification of ASTM D648 employing a load of 264 psi.

MOR refers to modulus of rupture which was measured in accordance with a modification of ASTM D790 and is reported in terms of $psi \times 10^3$.

Imp. Str. refers to impact strength which was measured in accordance with a modification of ASTM D256 utilizing notched Izod and is recorded in terms of foot pounds/inch.

Elast. Mod. refers to elastic modulus which was measured in accordance with a modification of ASTM D638 and is reported in terms of $psi \times 10^6$.

Ten. Str. refers to tensile strength which was also measured in accordance with a modification of ASTM D638 and is reported in terms of $psi \times 10^3$.

% Elong. refers to % elongation which was again measured in accordance with a modification of ASTM D638.

PEI refers to polyetherimide.

PES refers to polyether sulfone.
PEEK refers to polyetherether ketone.
PFA refers to perfluoroalkoxy resin (teflon).
PEK refers to polyether ketone.
LCP refers to liquid crystal polyester.
24 boil refers to the properties exhibited by the alloy after immersion in boiling water for 24 hours.

The Tg of Example 7 was measured and nominal values of the remaining properties are also reported.

The ratios of glass to polymer, e.g., 50/50 Ex.1/PEI, reflect weight % glass to weight % polymer, that is 50% Example 1 glass and 50% PEI.

Temperatures are recited in terms of ° F.

TABLE II

| | HDT | MOR | Imp. Str. | Elast. Mod. | Ten. Str. | % Elong. |
|---|---|---|---|---|---|---|
| 50/50 Ex.1/PEI | 323–338 | 18.8 | 0.52 | 0.6 | 7.0 | 1.84 |
| 50/50 Ex.1/PFA | — | 8.1 | 1.23 | 0.82 | 5.0 | — |
| 60/40 Ex.2/PEI | 407–412 | — | 0.81 | 1.73 | 9.9 | 0.89 |
| 50/50 Ex.2/PES | 417–441 | 22.2 | 0.87 | 1.65 | 10.3 | 0.67 |
| 70/30 Ex.2/PES | 398–422 | 13.1 | 0.65 | 3.2 | 6.7 | 0.22 |
| 50/50 Ex.3/PEEK | 355–394 | 24.3 | — | 1.22 | 12.5 | 1.42 |
| 50/50 Ex.4/PEEK | 442–462 | 31.9 | 0.53 | 1.5 | 10.2 | 0.73 |
| 75/25 Ex.4/PEEK | 513–545 | 28.7 | 0.48 | 3.4 | 10.1 | 0.30 |
| 80/20 Ex.5/PEEK | 533 | 12.5 | 0.58–0.67 | 3.1 | 7.0 | 0.25 |
| 80/10/10 Ex.5/PEEK/PFA | 440–490 | 15.5 | 0.52 | 2.4 | 7.6 | 0.33 |
| 80/20 Ex.6/PEEK | 525 | 19.7 | 0.75 | 3.2 | 11.9 | 0.45 |
| 80/20 Ex.7/PEEK | 542–568 | 18.5 | 0.48 | 3.9 | 12.0 | 0.36 |
| 85/15 Ex.7/PEK | >570 | 17.9 | 0.52 | 4.29 | 11.0 | 0.29 |
| 80/20 Ex.6/PEK | 550 | 26 | — | 2.46 | 16 | 0.91 |
| 80/20 Ex.7/LCP | 550 | 12.7 | 0.55 | 2.34 | 7.7 | 0.44 |
| 24 boil | — | 9.7 | — | 2.56 | 4.6 | 0.35 |
| 70/30 Ex.7/LCP | 493 | 17.7 | — | 2.92 | 11.8 | 0.59 |
| 24 boil | — | 15.1 | — | 2.83 | 11.2 | 0.54 |
| 50/50 Ex.8/PEEK | 337 | 6.8 | — | 0.97 | 6.8 | 2.58 |
| 70/30 Ex.10/PEK | 495 | 12.1 | 0.43 | 1.67 | 6.8 | 0.50 |
| 80/20 Ex.11/PEK | 553 | 15.9 | 0.55 | 2.44 | 9.26 | 0.44 |
| 100 PEI | 410 | — | 1.0 | 0.48 | 15.2 | 8–60 |
| 100 PEK | 367 | — | 1.3 | 0.58 | 15.0 | 5 |
| 100 PES | 400 | — | 1.6 | 0.35 | 12.2 | 40–80 |
| 100 PEEK | 320 | — | 1.6 | 0.16 | 14.5 | 30–150 |
| 100 LCP | 630 | 20.1 | 4.6 | — | 15.9 | 1.1 |
| Example 7 | Tg 625 | ≈6.0 | <0.1 | ≈6.0 | ≈3.0 | ≈0.05 |

As can readily be observed from the above table, the inventive alloys exhibit properties with values beyond those simply intermediate between those of the individual components. For example, modulus of rupture values of glasses generally range about $5-8 \times 10^3$ psi. Yet, the blending of polymer therewith can yield an alloy demonstrating a modulus of rupture two-to-four times those values. The resistance to attack by moisture and weak alkali solutions exhibited by the alloys is also improved, when compared with that of the glass. When measured on the Rockwell L Scale, alloys containing only about 50% by weight glass demonstrated a hardness of about 75% of that of the glass; that hardness value rising as the amount of the glass in the alloy is raised. The effect on the impact strength of glass is especially noteworthy. Hence, impact testing of notched or cracked glass bodies has resulted in extremely low values, viz., <0.1 foot pound/inch. As can be seen, values measured on the inventive alloys, in contrast, are much greater than those exhibited by the glasses alone. Furthermore, the stiffness (elastic modulus) of the inventive alloys can be in the range of $4 \times 10^6$ psi, more than double that of injection molded, filled polymer composites.

Fluorocarbon polymers are well recognized in the art as being characterized by thermal stability, chemical inertness, hydrophobicity, and low coefficient of friction. It was conjectured that, when blended with a low melting glass either alone or in combination with other polymers, the resulting product would exhibit improved properties in terms of mechanical strength, elastic modulus, hardness, and mechanical stability, while maintaining such useful properties as non-stick performance and low coefficient of friction. Therefore, research was undertaken to specifically evaluate that conjecture.

Accordingly, various blends of glasses and fluorocarbon polymers (with occasionally an additional polymer) were processed utilizing the laboratory twin screw extruder described above for mixing the ingredients, but varying the actual extrusion conditions somewhat. Thus, the temperature controller of the extruder was modified to enable the use of temperatures greater than 400° C. Such modification permitted a typical extrusion temperature profile of 350° C. in the feed throat and 405° C. in all other zones. Screw speeds of about 25-35 rpm were utilized with torque readings of 2700-5900 m-g observed. The materials were extruded through a ⅛ inch (≈3.2 mm) diameter die into rod and collected or pelletized.

The relative viscosities of the phases (which can quite apparently be adjusted via modifying the composition of the glass and/or through the selection of the polymer) and the proportions of the phases influence the microstructure and characteristics of the resulting alloys. Customarily, the phase having the lower viscosity forms the matrix, unless it is present in only low levels. Microscopic examination of the surface of injection molded bars has indicated that the phase of lower viscosity preferentially occurs there. Based upon that phenomenon, differences in viscosity have been utilized to form surfaces which are enriched in either glass, a fluorocarbon polymer, or another polymer.

Alloys containing concentrations of glass ranging from 50-87% by weight (≈47-83% by volume) were processed into dense rod. At glass levels of 50% and 75% by weight (=47 and 72% by volume), the alloys have a polymer matrix with glass as the dispersed phase. Table III, utilizing a format similar to that of Table II above, reports the properties of several injection molded alloys.

TABLE III

| | HDT | MOR | Imp. Str. | Elast. Mod. | Ten. Str. | % Elong. |
|---|---|---|---|---|---|---|
| 50/50 Ex.1/PFA | — | 8.1 | 1.23 | 0.82 | 5.9 | 97 |
| 80/10/10 Ex.5 PFA/PEEK | — | 13.6 | 0.31 | 3.1 | 7.3 | 0.25 |
| 80/15/5 Ex.5 PFA/PEEK | — | 12.1 | 0.14 | 2.9 | 9.0 | 0.33 |

At high glass loadings, e.g., 87/13 glass/PFA and 90/7/3 glass/PEEK/PFA, the extrudate was pliable and exhibited exceptional melt strength, thereby indicating their suitability for use in numerous forming operations, such as sheet extrusion, profile extrusion, and thermoforming. Upon cooling, the extruded rod became very hard and exhibited the brittle fracture typical of glasses with a surface texture that was smooth and slippery. Microscopic analyses of the blends containing 80-90% by weight glass disclosed glass matrices with the polymer uniformly distributed throughout the system. Examination of fracture surfaces revealed remarkable adhesion between the fluorocarbon polymer and the glass. The dispersed fluoropolymer phase acts to toughen the glass phase in much the same way as dispersed rubber particles are used to toughen high impact polystyrene.

The properties demonstrated by these glass/fluorocarbon polymer alloys give rise to a whole host of applications including non-stick ovenware, scientific laboratory ware, low friction bearings, joints, and surfaces, optical waveguide coatings and connectors, non-stick, abrasion resistant coatings for industrial components and cookware, and adhesion materials for joining fluorocarbon polymer sheets to glasses and metals.

Whereas, in the above-described procedure for high shear melt mixing of the glass and polymer components, those components were utilized in the form of finely-divided particles and fed through a twin screw extruder, it will be appreciated that such practice is not necessary. For example in like manner to the commercial production of resin polymers, continuous-type intensive mixers may be employed. Furthermore, large particles, pellets, balls, etc. can be used in batch processes with high shear mixers. Also, it is possible to blend together fluid streams of glass and polymer, rather than using particulate components. In whatever form and size the starting ingredients are utilized, however, high shear mixing is demanded in order to produce the required fine-grained microstructure in the alloy.

At the present time the most preferred combination of glass and polymer appears to be about 75% by weight of the glass of Example 10 and 25% by weight PEK.

FIG. 1 is a scanning electron micrograph taken at a magnification of 2000 of a polished section of an alloy article prepared in the manner described above with respect to the alloy articles reported in Table II. The bar at the bottom of the micrograph represents 10 microns. The alloy article consisted of 75% by weight of the glass of Example 9 of Table I and 25% by weight polyether sulfone (PES). As can be observed in the micrograph, the alloy was composed of a polymer matrix with fine spherical particles of glass dispersed within that matrix. Localized phase inversion/reversal is also apparent in the two larger spherical glass regions which contain fine polymer particles.

Figure 2:
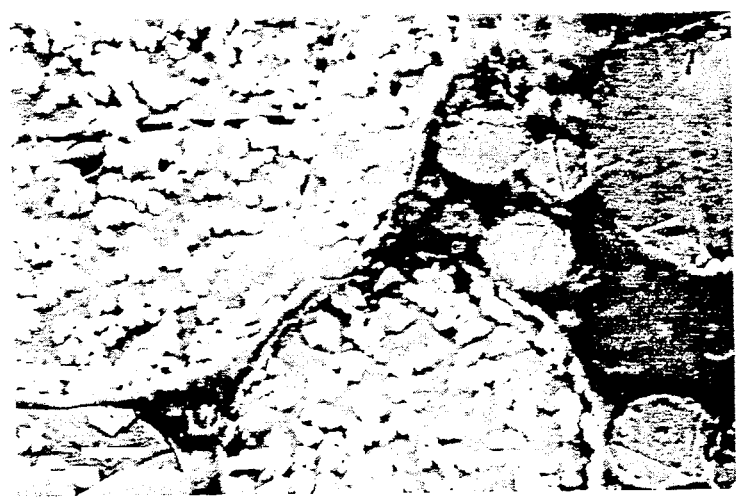

FIG. 2 is a scanning electron micrograph taken at a magnification of 10,000 of a polished section of an alloy article prepared in accordance with the description above of the alloy articles set out in Table II. The bar at the bottom of the micrograph represents 1 micron. The alloy comprised 80% by weight of the glass of Example 8 of Table I and 20% by weight polyetheretherketone (PEEK). The micrograph reflects an enlargement of a microstructure similar to that presented in FIG. 1. However, some of the glass has crystallized, as is evidenced by the light colored dendritic growth observed in the spherical glass particles, thereby yielding a glass-ceramic/polymer alloy.

Figure 3:
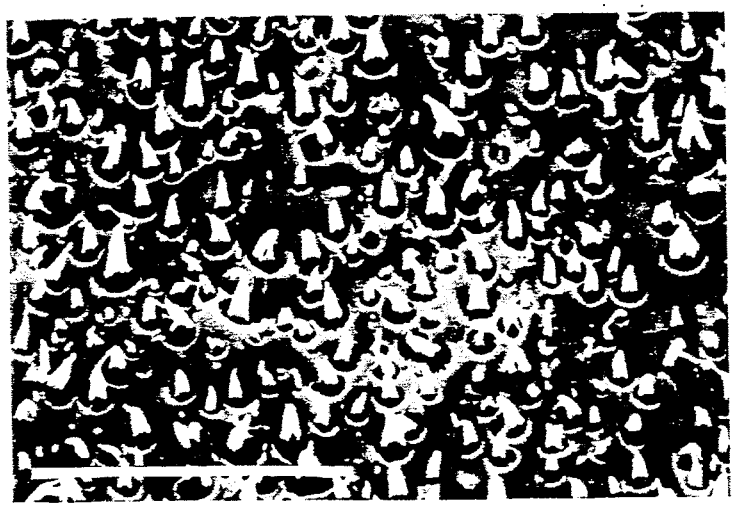

FIG. 3 is a scanning electron micrograph taken at a magnification of 5000 of a fractured section of an alloy article prepared in like fashion to the alloy articles listed above in Table II. The bar at the bottom of the micrograph represents 10 microns. The alloy consisted of 75% by weight of the glass of Example 4 of Table I and 25% by weight of perfluoroalkoxy resin (PFA). The micrograph illustrates a microstructure comprising a glass matrix containing a dispersion of fine spherical particles of polymer. The remarkable adhesion exhibited between the glass and the PFA is regarded as substantive evidence of limited mutual solubility (partial miscibility) between the two materials.

Figure 4:

FIG. 4 is a scanning electron micrograph taken at a magnification of 2000 of a polished section of an alloy article prepared according to the procedure followed for the alloy articles recorded above in Table II. The bar at the base of the micrograph again denotes 10 microns. The alloy was constituted of 75% by weight of the glass of Example 4 of Table I and 25% by weight of PEEK. The light, rather continuous, amorphous-shaped regions containing small dark spots seen in the micrograph indicate a glass phase (white) with small particles of polymer (dark) which are believed to have precipitated from the melt during cooling thereof. In like manner, the continuous polymer phase (dark) contains a fine dispersion of glass particles which are believed to have been dissolved in the molten polymer and thereafter precipitated during cooling. The proportions of the two phases shown in the micrograph demonstrate that the glass is somewhat more miscible in the polymer than the polymer is miscible in the glass.

Figure 5:

FIG. 5 is a scanning electron micrograph taken at a magnification of 2000 of a fractured surface of the sample alloy article as described above in FIG. 4. The bar at the base yet again denotes 10 microns. Extraordinary adhesion between the glass and the polymer is indicated by the fracture path observed running through both the glass (smooth conchoidal fracture) and the polymer-rich phase (rough fracture), rather than along the interface between the two phases. That remarkable strong adhesion is further evidence of the partial miscibility of the two phases with each other.

We claim:

1. An alloy comprising a melt mixture of at least one glass and/or glass-ceramic and at least one organic thermoplastic or thermosetting polymer, said alloy exhibiting an essentially uniform, fine-grained microstructure comprised of polymer and glass and/or glass-ceramic elements wherein said microstructure is selected from the group consisting of:
    (a) localized phase inversion/reversal;
    (b) an interconnected, co-continuous spinodal-type microstructure;
    (c) fine spherical, ellipsoidal, and/or serpentine particles of glass and/or glass-ceramic separated by thin membranes of polymer;
    (d) an interlocking, three-dimensional microstructure comprising islands of glass and/or glass-ceramic in polymer, said polymer having the appearance of winding channels;
    (e) an interlocking, three-dimensional microstructure comprising islands of polymer in glass and/or glass-ceramic, said glass and/or glass/ceramic having the appearance of winding channels;
    (f) a fine emulsion of glass and/or glass-ceramic dispersed in polymer; and
    (g) a fine emulsion of polymer dispersed in glass and/or glass-ceramic.

2. An alloy according to claim 1 wherein said polymer and glass and/or glass-ceramic elements are of relatively uniform dimensions.

3. An alloy according to claim 1 wherein the dispersed particles of said polymer and glass and/or glass-ceramic elements are less than 50 microns in the largest dimension.

4. An alloy according to claim 1 wherein said polymer and glass and/or glass-ceramic elements are in an essentially non-oriented relationship.

5. An alloy according to claim 1 which is essentially non-hygroscopic and exhibits excellent resistance to attack by moisture.

6. An alloy according to claim 5 wherein said glass and/or glass-ceramic is essentially non-hygroscopic and exhibits excellent resistance to attack by moisture.

7. An alloy according to claim 6 wherein said glass and/or glass-ceramic exhibits a dissolution rate in boiling water of less than $1 \times 10^{-4}$ g/cm$^2$/min.

8. An alloy according to claim 6 wherein said glass and/or glass-ceramic exhibits a weight gain of less than $1 \times 10^{-66}$ g/cm$^2$/min when exposed at 40° C. to a relative humidity of 80%.

9. An alloy according to claim 1 wherein said glass and/or glass-ceramic constitutes about 30-90% by volume of said alloy.

10. An alloy according to claim 9 wherein said glass and/or glass-ceramic constitutes about 40-75% by volume of said alloy.

11. An alloy according to claim 1 wherein said glass consists essentially, expressed in terms of mole percent on the oxide basis, of 44-58% $P_2O_5$, 4-10% $Al_2O_3 + B_2O_3$, consisting of 0-7% $Al_2O_3$ and 0-10% $B_2O_3$, 10-45% $Li_2O + Na_2O$, consisting of 0-30% $Li_2O$ and 10-30% $Na_2O$, 0-20% $Cu_2O$, and 10-30% $Li_2O + Cu_2O$.

12. An alloy according to claim 1 wherein said glass consists essentially, expressed in terms of mole percent on the oxide basis, of 10-35% $R_2O$, wherein $R_2O$ consists of at least two alkali metal oxides in the indicated proportions selected from the group consisting of 0-25% $Li_2O$, 0-25% $Na_2O$, and 0-25% $K_2O$, 12-55% ZnO, and 28-40% $P_2O_5$ 13. An alloy according to claim 1 wherein said glass-ceramic contains a lithium-, zinc-, and/or lead-containing phosphate as the predominant crystal phase and consists essentially, expressed in terms of mole percent on the oxide basis, of 5-25% $Li_2O + Na_2O + K_2O$, consisting of 5-25% $Li_2O$, 0-15% $Na_2O$, and 0-10% $K_2O$, 35-50% ZnO, 0.75-6% $Al_2O_3$, and 29-37% $P_2O_5$.

14. An alloy according to claim 1 wherein said glass consists essentially, expressed in terms of mole percent on the oxide basis, of 10–35% $R_2O$, wherein $R_2O$ consists of at least one alkali metal oxide in the indicated proportion selected from the group consisting of 0–25% $Li_2O$, 0–25% $Na_2O$, and 0–25% $K_2O$, 12–55% ZnO, and 28–40% $P_2O_5$, and 0.5–5% total of $Y_2O_3$ and/or at least one oxide of a rare earth metal selected from the lanthanide group.

15. An alloy according to claim 1 wherein said thermoplastic polymer is selected from the group consisting of polyarylether ketones, polyphenylene sulfides, polyfluoro resins, polyetherimides, liquid crystal polyesters, polyethersulfones, polytetrafluoroethylenes, polyetherether ketones, polyetherketones, polyethylterephthalates, polybutylterephthalates, melamines, and polycarbonates.

16. An alloy according to claim 1 wherein said thermosetting polymer is selected from the group consisting of epoxy resins, silicone resins, polyimides, phenolics, and diallyl phthalates.

17. An alloy comprising a melt mixture of at least one inorganic glass and/or glass-ceramic and at least one organic thermoplastic or thermosetting polymer, there being at least partial miscibility and/or a reaction between said glass and/or the precursor glass for said glass-ceramic and said polymer to promote adhesion and/or bonding therebetween, said alloy exhibiting an essentially uniform, fine-grained microstructure of polymer and glass and/or glass-ceramic elements wherein said microstructure is selected from the group consisting of:
  (a) localized phase inversion/reversal;
  (b) an interconnected, co-continuous spinodal-type microstructure;
  (c) fine spherical, ellipsoidal, and/or serpentine particles of glass and/or glass-ceramic separated by thin membranes of polymer;
  (d) an interlocking, three-dimensional microstructure comprising islands of glass and/or glass-ceramic in polymer, said polymer having the appearance of winding channels;
  (e) an interlocking, three-dimensional microstructure comprising islands of polymer in glass and/or glass-ceramic, said glass and/or glass-ceramic having the appearance of winding channels;
  (f) a fine emulsion of glass and/or glass-ceramic dispersed in polymer; and
  (g) a fine emulsion of polymer dispersed in glass and/or glass-ceramic.

18. An alloy according to claim 17 wherein said polymer and glass and/or glass-ceramic elements are of relatively uniform dimensions.

19. An alloy according to claim 17 wherein the dispersed particles of said polymer and glass and/or glass-ceramic elements are less than 50 microns in the largest dimension.

20. An alloy according to claim 17 wherein said polymer and glass and/or glass-ceramic elements are in an essentially non-oriented relationship.

21. An alloy according to claim 17 which is essentially non-hygroscopic and exhibits excellent resistance to attack by moisture.

22. An alloy according to claim 21 wherein said glass and/or glass-ceramic is essentially non-hygroscopic and exhibits excellent resistance to attack by moisture.

23. An alloy according to claim 22 wherein said glass and/or glass-ceramic exhibits a dissolution rate in boiling water of less than $1 \times 10^{-4}$ g/cm$^2$/min.

24. An alloy according to claim 22 wherein said glass and/or glass-ceramic exhibits a weight gain of less than $1 \times 10^{-6}$ g/cm$^2$/min. when exposed at 40° C. to a relative humidity of 80%.

25. An alloy according to claim 17 wherein said glass and/or glass-ceramic constitutes about 30–90% by volume of said alloy.

26. An alloy according to claim 25 wherein said glass and/or glass-ceramic constitutes about 40–75% by volume of said alloy.

27. An alloy according to claim 17 wherein said glass consists essentially, expressed in terms of mole percent on the oxide basis, of 44–58% $P_2O_5$, 4–10% $Al_2O_3$ + $B_2O_3$, consisting of 0–7% $Al_2O_3$ and 0–10% $B_2O_3$, 10–45% $Li_2O$ + $Na_2O$, consisting of 0–30% $Li_2O$ and 10–30% $Na_2O$, 0–20% $Cu_2O$, and 10–30% $Li_2O$ + $Cu_2O$, 28. An alloy according to claim 17 wherein said glass consists essentially, expressed in terms of mole percent on the oxide basis, of 10–35% $R_2O$, wherein $R_2O$ consists of at least two alkali metal oxides in the indicated proportions selected from the group consisting of 0–25% $Li_2O$, 0–25% $Na_2O$, and 0–25% $K_2O$, 12–55% ZnO, and 28–40% $P_2O_5$ 29. An alloy according to claim 17 wherein said glass-ceramic contains a lithium-, zinc-, and/or lead-containing phosphate as the predominant crystal phase and consists essentially, expressed in terms of mole percent on the oxide basis, of 5–25% $Li_2O$ + $Na_2O$ + $K_2O$, consisting of 5–25% $Li_2O$, 0–15% $Na_2O$, and 0–10% $K_2O$, 35–50% ZnO, 0.75–6% $Al_2O_3$, and 29–37% $P_2O_5$.

30. An alloy according to claim 17 wherein said glass consists essentially, expressed in terms of mole percent on the oxide basis, of 10–35% $R_2O$, wherein $R_2O$ consists of at least one alkali metal oxide in the indicated proportion selected from the group consisting of 0–25% $Li_2O$, 0–25% $Na_2O$, and 0–25% $K_2O$, 12–55% ZnO, and 28–40% $P_2O_5$, and 0.5–5% total of $Y_2O_3$ and/or at least one oxide of a rare earth metal selected from the lanthanide group.

31. An alloy according to claim 17 wherein said thermoplastic polymer is selected from the group consisting of polyarylether ketones, polyphenylene sulfides, polyfluoro resins, polyetherimides, liquid crystal polyesters, polyethersulfones, polyetherether ketones, polyetherketones, polyethylterephthalates, polybutylterephthalates, melamines, and polycarbonates.

32. An alloy according to claim 17 wherein said thermosetting polymer is selected from the group consisting of epoxy resins, silicone resins, polyimides, phenolics, and diallyl phthalates.

33. A method for making an article of an alloy comprising a melt mixture of at least one inorganic glass and at least one organic thermoplastic or thermosetting polymer, the working temperature of said glass being compatible with the working temperature of said polymer, which comprises the steps of:
  (a) high shear dispersive mixing of said glass and polymer at a temperature and viscosity represented by the working temperature thereof to form a melt mixture of said glass and polymer;
  (b) shaping said mixture into an article of a desired geometry; and then
  (c) cooling said article to room temperature;
said alloy exhibiting an essentially uniform, fine-grained microstructure of polymer and glass elements wherein said microstructure is selected from the group consisting of:
- (a) localized phase inversion/reversal;
- (b) an interconnected, co-continuous spinodal-type microstructure;
- (c) fine spherical ellipsoidal, and/or serpentine particles of glass and/or glass-ceramic separated by thin membranes of polymer;
- (d) an interlocking, three-dimensional microstructure comprising islands of glass and/or glass-ceramic in polymer, said polymer having the appearance of winding channels;
- (e) an interlocking, three-dimensional microstructure comprising islands of polymer in glass and/or glass-ceramic, said glass and/or glass-ceramic having the appearance of winding channels;
- (f) a fine emulsion of glass and/or glass-ceramic dispersed in polymer; and
- (g) a fine emulsion of polymer dispersed in glass and/or glass-ceramic.

34. A method according to claim 33 wherein said glass and polymer are subjected to high shear dispersive mixing in the form of finely-divided bodies.

35. A method according to claim 33 wherein said working temperature represents a temperature at which said glass exhibits a viscosity of less than $10^8$ poises 36. A method according to claim 35 wherein said working temperature represents a temperature at which said glass exhibits a viscosity between about $10^4$–$10^7$ poises 37. A method according to claim 33 wherein said working temperature is below 500° C.

38. A method according to claim 37 wherein said working temperature is between about 350°–450° C.

39. A method according to claim 33 wherein the source of said high shear dispersive mixing is a twin screw extruder.

40. A method according to claim 33 wherein said polymer and glass elements are of relatively uniform dimensions.

41. A method according to claim 33 wherein the dispersed particles of said polymer and glass elements are less than 50 microns in the largest dimension.

42. A method according to claim 33 wherein said polymer and glass elements are in an essentially non-oriented relationship.

43. A method according to claim 33 wherein said alloy is essentially non-hygroscopic and exhibits excellent resistance to attack by moisture.

44. A method according to claim 43 wherein said glass is essentially non-hygroscopic and exhibits excellent resistance to attack by moisture.

45. A method according to claim 44 wherein said glass exhibits a dissolution rate in boiling water of less than $1 \times 10^{-4}$ g/cm$^2$/min.

46. A method according to claim 44 wherein said glass exhibits a weight gain of less than $1 \times 10^{-6}$ g/cm$^2$/min. when exposed at 40° C. to a relative humidity of 80%.

47. A method according to claim 33 wherein said glass constitutes about 30–90% by volume of said alloy.

48. A method according to claim 47 wherein said glass constitutes about 40–75% by volume of said alloy.

49. A method according to claim 33 wherein said glass consists essentially, expressed in terms of mole percent on the oxide basis, of 44–58% $P_2O_5$, 4–10% $Al_2O_3 + B_2O_3$, consisting of 0–7% $Al_2O_3$ and 0–10% $B_2O_3$, 10–45% $Li_2O + Na_2O$, consisting of 0–30% $Li_2O$ and 10–30% $Na_2O$, 0–20% $Cu_2O$, and 10–30% $Li_2O + Cu_2O$.

50. A method according to claim 33 wherein said glass consists essentially, expressed in terms of mole percent on the oxide basis, of 10–35% $R_2O$, wherein $R_2O$ consists of at least two alkali metal oxides in the indicated proportions selected from the group consisting of 0–25% $Li_2O$, 0–25% $Na_2O$, and 0–25% $K_2O$, 12–55% ZnO, and 28–40% $P_2O_5$, 51. A method according to claim 53 wherein said glass consists essentially, expressed in terms of mole percent on the oxide basis, of 10–35% $R_2O$, wherein $R_2O$ consists of at least one alkali metal oxide in the indicated proportion selected from the group consisting of 0–25% $Li_2O$, 0–25% $Na_2O$, and 0–25% $K_2O$, 12–55% ZnO, and 28–40% $P_2O_5$, and 0.5–5% total of $Y_2O_3$ and/or at least one oxide of a rare earth metal selected from the lanthanide group.

52. A method according to claim 53 wherein said thermoplastic polymer is selected from the group consisting of polyarylether ketones, polyphenylene sulfides, polyfluoro resins, polyetherimides, liquid crystal polyesters, polyethersulfones, polytetrafluoroethylenes, polyetherether ketones, polyetherketones, polyethylterephthalates, polybutylterephthalates, melamines, and polycarbonates.

53. A method according to claim 53 wherein said thermosetting polymer is selected from the group consisting of epoxy resins, silicone resins, polyimides, phenolics, and diallyl phthalates.

54. A method for making an article of an alloy comprising a melt mixture of at least one inorganic glass-ceramic and at least one organic thermoplastic or thermosetting polymer, the working temperature of the precursor glass for said glass-ceramic being compatible with the working temperature of said polymer, which comprises the steps of:
- (a) high shear dispersive mixing of said precursor glass and polymer at a temperature and viscosity represented by the working temperature thereof to form a melt mixture of said precursor glass and polymer;
- (b) cooling and simultaneously shaping said mixture into an article of a desired geometry;
- (c) heat treating said article to cause said precursor glass to crystallize in situ to form a glass-ceramic; and then
- (d) cooling said article to room temperature.

said alloy exhibiting an essentially uniform, fine-grained microstructure of polymer and glass-ceramic elements wherein said microstructure is selected from the group consisting of:
- (a) localized phase inversion/reversal;
- (b) an interconnected, co-continuous spinodal-type microstructure;
- (c) fine spherical, ellipsoidal, and/or serpentine particles of glass-ceramic separated by thin membranes of polymer;
- (d) an interlocking, three-dimensional microstructure comprising islands of glass-ceramic in polymer, said polymer having the appearance of winding channels;
- (e) an interlocking, three-dimensional microstructure comprising islands of polymer in glass-ceramic, said glass-ceramic having the appearance of winding channels;

(f) a fine emulsion of glass-ceramic dispersed in polymer; and (g) a fine emulsion of polymer dispersed in glass-ceramic.

55. A method according to claim 54 wherein said precursor glass and polymer are subjected to high shear dispersive mixing in the form of finely-divided bodies.

56. A method according to claim 54 wherein said working temperature represents a temperature at which said precursor glass exhibits a viscosity of less than $10^8$ poises 57. A method according to claim 56 wherein said working temperature represents a temperature at which said precursor glass exhibits a viscosity between about $10^4$–$10^7$ poises 58. A method according to claim 54 wherein said working temperature is below 500° C.

59. A method according to claim 58 wherein said working temperature is between about 350°–450° C.

60. A method according to claim 54 wherein the source of said high shear dispersive mixing is a twin screw extruder.

61. A method according to claim 54 wherein said shaping of said mixture into an article of a desired geometry and said heat treating of said article are carried out in the same step.

62. A method according to claim 54 wherein said polymer and glass and/or glass-ceramic elements are of relatively uniform dimensions.

63. A method according to claim 54 wherein the dispersed particles of said polymer and glass-ceramic elements are less than 50 microns in the largest dimension.

64. A method according to claim 54 wherein said polymer and glass-ceramic elements are in an essentially nonoriented relationship.

65. A method according to claim 54 wherein said alloy is essentially non-hygroscopic and exhibits excellent resistance to attack by moisture.

66. A method according to claim 65 wherein said glass-ceramic is essentially non-hygroscopic and exhibits excellent resistance to attack by moisture.

67. A method according to claim 66 wherein said glass-ceramic exhibits a dissolution rate in boiling water of less than $1 \times 10^{-4}$ g/cm$^2$/min.

68. A method according to claim 66 wherein said glass-ceramic exhibits a weight gain of less than $1 \times 10^{-6}$ g/cm$^2$/min when exposed at 40° C. to a relative humidity of 80%.

69. A method according to claim 54 wherein said glass-ceramic constitutes about 30–90% by volume of said alloy.

70. A method according to claim 69 wherein said glass-ceramic constitutes about 40–75% by volume of said alloy.

71. A method according to claim 54 wherein said glass-ceramic contains a lithium-, zinc-, and/or lead-containing phosphate as the predominant crystal phase and consists essentially, expressed in terms of mole percent on the oxide basis, of 5–25% Li$_2$O+Na$_2$O+K$_2$O, consisting of 5–25% Li$_2$O, 0–15% Na$_2$O, and 0–10% K$_2$O, 35–50% ZnO, 0.75–6% Al$_2$O$_3$, and 29–37% P$_2$O$_5$.

72. A method according to claim 54 wherein said thermoplastic polymer is selected from the group consisting of polyarylether ketones, polyphenylene sulfides, polyfluoro resins, polyetherimides, liquid crystal polyesters, polyethersulfones, polytetrafluoroethylenes, polyetherether ketones, polyetherketones, polyethylterephthalates, polybutylterephthalates, melamines, and polycarbonates.

73. A method according to claim 54 wherein said thermosetting polymer is selected from the group consisting of epoxy resins, silicone resins, polyimides, phenolics, and diallyl phthalates.

* * * * *

UNITED STATES PATENT AND TRADEMARK OFFICE
CERTIFICATE OF CORRECTION

PATENT NO. : 5,043,369

DATED : August 27, 1991

INVENTOR(S) : W. A. Bahn, et al.

It is certified that error appears in the above-identified patent and that said Letters Patent is hereby corrected as shown below:

Col. 6, line 9, "350°450°" should read --350°-450°--.

Col. 11, between lines 67 and 68 insert --In each of the above six determinations the samples were conditioned and measured in the ambient temperature corresponded to the required ASTM range of 23±2°C (73.4±3.6°F) but the humidity was not rigidly controlled--.

Col. 13, line 64, "(=47" should read --(≅47--.

Claim 8, col. 16, line 37, "$1 \times 10^{66} g/cm^2/min$" should read --$1 \times 10^6 g/cm^2/min$--.

Claim 23, col. 17, line 68, "$1 \times 10-4 \ g/cm^2/min$" should read --$1 \times 10^{-4} g/cm^2/min$.--

Claim 31, col. 18, line 46, insert after "polyethersulfones," the word --polytetrafluoroethylenes,--.

Claim 51, col. 20, line 11, "53" becomes --33--.

Claim 53, col. 20, line 28, "53" becomes --33--.

Signed and Sealed this

Fifth Day of January, 1993

*Attest:*

DOUGLAS B. COMER

*Attesting Officer*    *Acting Commissioner of Patents and Trademarks*